United States Patent
Fukushima et al.

(10) Patent No.: US 8,610,326 B2
(45) Date of Patent: Dec. 17, 2013

(54) STATOR DESIGNED TO MINIMIZE LEAKAGE CURRENT AND ELECTRIC ROTATING MACHINE USING SAME

(75) Inventors: Akira Fukushima, Kariya (JP); Keiji Kondo, Toyota (JP); Akito Akimoto, Kariya (JP); Takeo Maekawa, Okazaki (JP); Makoto Taniguchi, Obu (JP); Shin Kusase, Obu (JP)

(73) Assignee: Denso Corporation, Kariya (JP)

( * ) Notice: Subject to any disclaimer, the term of this patent is extended or adjusted under 35 U.S.C. 154(b) by 261 days.

(21) Appl. No.: 12/984,777

(22) Filed: Jan. 5, 2011

(65) Prior Publication Data

US 2011/0163625 A1 Jul. 7, 2011

(30) Foreign Application Priority Data

Jan. 7, 2010 (JP) ................. 2010-001960

(51) Int. Cl.
*H02K 3/28* (2006.01)
(52) U.S. Cl.
USPC ............................ 310/201; 310/184; 310/198
(58) Field of Classification Search
USPC .................................. 310/184, 201, 207, 198
See application file for complete search history.

(56) References Cited

U.S. PATENT DOCUMENTS

| | | | | |
|---|---|---|---|---|
| 5,998,903 | A * | 12/1999 | Umeda et al. | 310/179 |
| 6,137,201 | A * | 10/2000 | Umeda et al. | 310/179 |
| 6,552,463 | B2 * | 4/2003 | Oohashi et al. | 310/207 |
| 6,787,961 | B2 * | 9/2004 | Neet et al. | 310/201 |
| 6,798,106 | B2 * | 9/2004 | Nakamura et al. | 310/179 |
| 6,979,927 | B2 * | 12/2005 | Kometani et al. | 310/193 |
| 8,082,653 | B2 * | 12/2011 | Akimoto et al. | 29/596 |
| 2006/0163959 | A1 | 7/2006 | Ogawa et al. | |
| 2006/0208594 | A1 | 9/2006 | Kashihara et al. | |
| 2009/0146523 | A1 * | 6/2009 | Kouda et al. | 310/195 |
| 2010/0141078 | A1 | 6/2010 | Kouda et al. | |

FOREIGN PATENT DOCUMENTS

| | | |
|---|---|---|
| JP | 2005-124375 | 5/2005 |
| JP | 2006-211810 | 8/2006 |
| JP | 2007-221859 | 8/2007 |
| JP | 2007-274809 | 10/2007 |
| JP | 2008-253063 | 10/2008 |
| JP | 2009-112186 | 5/2009 |
| WO | WO 2005/107040 | 11/2005 |

OTHER PUBLICATIONS

Office Action (2 pages) dated Sep. 10, 2013, issued in corresponding Japanese Application No. 2010-001960 and English translation (3 pages).

* cited by examiner

*Primary Examiner* — Tran Nguyen
(74) *Attorney, Agent, or Firm* — Nixon & Vanderhye, PC

(57) ABSTRACT

A stator which may be employed in an electric rotating machine. The stator includes a stator winding which includes in-slot portions disposed in slots of a stator core. The in-slot portions are arrayed in each of the slots in a form of multiple layers aligned in a radial direction of the stator core. The stator winding is made up of a first winding and a second winding which are connected together through a joint. The first winding is defined by a portion of the stator winding between the joint and an end of the stator winding which is to be connected to an external. The second winding includes the in-slot portion placed within at least one of the slots as an outermost layer that is one of the layers placed most outwardly in the radial direction of the stator core. This results in a great decrease in leakage current.

14 Claims, 19 Drawing Sheets

1

STATOR DESIGNED TO MINIMIZE LEAKAGE CURRENT AND ELECTRIC ROTATING MACHINE USING SAME

CROSS REFERENCE TO RELATED DOCUMENT

The present application claims the benefit of priority of Japanese Patent Application No. 2010-1960 filed on Jan. 7, 2010, the disclosure of which is incorporated herein by reference.

BACKGROUND OF THE INVENTION

1. Technical Field of the Invention

The present invention relates generally to a stator which may be used with an electric rotating machine and designed to minimize leakage current, and an electric rotating machine equipped with such a stator.

2. Background Art

Japanese Patent First Publication No. 2009-112186, assigned to the same assignee as that of this application, discloses an electric rotating machine equipped with a hollow cylindrical stator in which a plurality of slots are formed. The slots extend in an axial direction of the stator. The stator is equipped with a stator winding made of wire. The stator winding has in-slot portions and turned portions. The in-slot portions are disposed inside the slots. Each of the turned portions connects between two of the in-slot portions outside the slots.

As viewed in a transverse section of the stator, the in-slot portions are arrayed, like in FIG. 17, in the form of multiple layers aligned in a radial direction of the stator. In FIG. 17, in-slot portions $320a$ are laid to overlap each other within a slot 330 in the radial direction of a stator 300. In the case where the stator winding is a three-phase winding, it is usually made up of a U-phase winding, a V-phase winding, and a W-phase winding. Ends of the U-, V-, and W-phase windings are disposed outside the slots in the radial direction of the stator because they must be connected electrically to a controller. Portions of the stator winding which are close to the ends of the U-, V-, and W-phase windings are, therefore, disposed in the slots as outermost layers.

The electric potential developed at the stator winding will be described below. FIG. 18 is a schematic view which shows a typical star-connected stator winding made up of U-, V-, and W-phase windings. Such a stator winding is wound in the stator with portions (i.e., the in-slot portions) aligned in the radial direction of the stator within the slots. In FIG. 18, "A" indicates a winding portion closer to an end U of the stator winding. "B" indicates a winding portion of the U-phase winding closer to a neutral point N. If a joint X of the winding portions A and B lies just at the middle between the end U and the neutral point N, an average potential developed at the joint X will be, as demonstrated in FIG. 19, a one-half (½) of that developed at the end U. Thus, the winding portion A closer to the end U is higher in potential than the winding portion B. The same applies to ends V and W.

In the case where the stator winding is made of a flat wire (also called a rectangular wire), side surfaces of the in-slot portions $320a$, as illustrated in FIG. 20, face the stator core 310, so that capacitors are created between each of the in-slot portions $320a$ and an inner wall of the slot of the stator core 310. The in-slot portions $320a$ arrayed within the slot in the radius direction will also be referred to below as a first to fourth layers starting from the outmost in-slot portion $320a$. Locations where the first to fourth layers are disposed in the slot will be referred to below as a first, a second, a third, and a fourth layer positions.

FIG. 20 shows transverse cross-sections of the first to fourth layers within the slot of the stator core 310.

An electrostatic capacitance C1, as established by the in-slot portion $320a$ in the first layer position, is given by $$C1 = C10 + C11 + C12$$

Similarly, capacitances C2 to C4, as created by the in-slot portions $320a$ in the second to fourth layer positions, are given by $$C2 = C21 + C22$$

$$C3 = C31 + C32$$

$$C4 = C41 + C42$$

FIG. 20 illustrates the transverse cross-section of each of the in-slot portions $320a$ as being rectangular since the stator winding is made of a flat wire. Actually, short sides of each of the in-slot portions $320a$ is much smaller than long sides thereof.

Accordingly, the capacitance C10 in FIG. 20 is much greater than the capacitances C11 to C42. Specifically, C10 >> C11, C12, C21, C22, C31, C32, C41, C42.

The following relation is, therefore, met.

$$C1 >> C2, C3, C4$$

If average potentials at the in-slot portions $320a$ placed in the first and fourth layer positions are defined as V1, V2, V3, and V4, a leakage current that is a time-derivative of a total charge is expressed by $$\Sigma dQ/dt = \Sigma d(Ck \cdot Vk)/dt (k=1,2,3,4)$$

In the case where the in-slot portion $320a$ of the stator winding placed in the outermost layer position (i.e., the first layer position) is close to the end of any of the U-, V-, and W-phase windings, the average potential V1 in the outermost layer position, as described above, will be high, thus resulting in an increased leakage current. This usually leads to the problem of the so-called radio noise.

SUMMARY OF THE INVENTION

It is therefore a principal object of the invention to avoid the disadvantages of the prior art.

It is another object of the invention to provide an improved structure of a stator designed to minimize the leakage current and an electric rotating machine using such a stator.

According to one aspect of the invention, there is provided a stator which may be employed in an electric rotating machine. The stator comprises: (a) a cylindrical stator core which has a plurality of slots arrayed in a circumferential direction of the stator core; and (b) a stator winding which includes in-slot portions disposed in the slots of the stator core and turned portions connecting the in-slot portions outside the slots. The in-slot portions are arrayed in each of the slots in a form of multiple layers aligned in a radial direction of the stator core. The stator winding has a length made up of a first winding and a second winding. The first winding is defined by a portion of the stator winding which is closer to an end of the stator winding which is to be connected to an external. The second winding is defined by a portion of the stator winding which is farther from the end of the stator and includes the in-slot portion placed within at least one of the slots as an outermost layer that is one of the layers placed most outwardly in the radial direction of the stator core.

Specifically, the first winding is usually higher in potential than the second winding. Based on this fact, the first winding is located in the outermost layer position in the slot. Referring to the example of FIG. 20, the average potential V1, as developed at the in-slot portion 320a, is decreased by placing the second winding in the outermost layer position in the slot 33. This results in a great decrease in leakage current.

In the preferred mode of the invention, the stator winding may be a three-phase winding made up of a first-phase winding, a second-phase winding, and a third-phase winding. The second winding includes the in-slot portions placed in all of the slots for the first-phase winding and the second-phase winding except one of the slots as outermost layers that are ones of the layers placed most outwardly in radial direction of the stator core. This enhances the beneficial effects in decreasing the leakage current. The in-slot portions of the second winding and the in-slot portions of the first winding are preferably aligned alternately in the radial direction of the stator core.

The second winding may alternatively include the in-slot portions placed in all of the slots as outermost layers that are ones of the layers placed most outwardly in radial direction of the stator core. For example, the in-slot portions placed in each of the slots are broken down into a first group and a second group. The first group defines the first winding and is placed outward of the slot in the radial direction of the stator core, while the second group defines the second winding and is placed inward of the slot in the radial direction of the stator core.

The stator winding may be made of a flat wire, that is, rectangular in transverse cross section thereof. In this case, the in-slot portions are so arrayed in each of the slots that long sides of transverse cross sections of the in-slot portions extend substantially perpendicular to the radial direction of the stator core. This results in an increase in electrostatic capacitance, as established by the in-slot portion placed in the outermost layer position, which will lead to a great decrease in leakage current.

The stator winding may be made of wire segments star-connected. In this case, the second winding is defined by a portion of the stator winding between the joint and a neutral point. The stator winding may alternatively be made of wire segments which are delta-connected. In this case, there is no neutral point. The in-slot portions remote from ends of the wire segments are low in average potential and, therefore, disposed as the second winding.

Each of the slots has a width, as defined in the circumferential direction of the stator core. The width may increase in a radially outward direction of the stator core since the electrostatic capacitance is inversely proportional to the distance between the stator winding and the stator core. This results in a decrease in electrostatic capacity, as developed by the stator winding, which leads to a decrease in leakage current.

The stator may also include an electric insulator which has an inner chamber in which an array of the in-slot portions is disposed, thereby minimizing undesirable movement of the in-slot portions in the circumferential direction of the stator core.

The electric insulator may be made of an assembly of an inner insulator and an outer insulator. The inner insulator is of a U-shape in transverse cross section, as taken perpendicular to an axial direction of the stator core, and has an end which opens outwardly of the stator core. The outer insulator is of a U-shape in transverse cross section, as taken perpendicular to the axial direction of the stator core, and has an end which opens inwardly of the stator core.

The inner insulator may have side walls extending in the radial direction of the stator core. The outer insulator may have side walls extending in the radial direction of the stator core. Ends of the side walls of the inner insulator are laid to overlap with ends of the side walls of the outer insulator in the circumferential direction of the stator core. This minimizes an air gap between a radially-outward portion of the array of the in-slot portions and the inner wall of the slot to minimize undesirable movement of the stator winding in the circumferential direction of the stator core.

The ends of the side walls of the inner insulator are folded back. The ends of the side walls of the inner insulator may be folded inwardly of the inner insulator. This insulates a radially-outward portion of the array of the in-slot portions in the form of three layers, thereby filling the air gap to hold the stator winding from moving in the circumferential direction of the stator core.

The stator winding may be a three-phase winding made up of wire segments which are star-connected or delta-connected.

According to another aspect of the invention, there is provided an electric rotating machine which comprises: (a) a stator and (b) a rotor. The stator comprises a cylindrical stator core which has a plurality of slots arrayed in a circumferential direction of the stator core, and a stator winding which includes in-slot portions disposed in the slots of the stator core and turned portions connecting the in-slot portions outside the slots. The in-slot portions are arrayed in each of the slots in a form of multiple layers aligned in a radial direction of the stator core. The stator winding has a length made up of a first winding and a second winding. The first winding is defined by a portion of the stator winding which is closer to an end of the stator winding which is to be connected to an external. The second winding is defined by a portion of the stator winding which is farther from the end of the stator and includes the in-slot portion placed within at least one of the slots as an outermost layer that is one of the layers placed most outwardly in the radial direction of the stator core. The rotor is disposed radially inside the stator and equipped with S-poles and N-poles which are arrayed alternately in a circumferential direction of the rotor.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
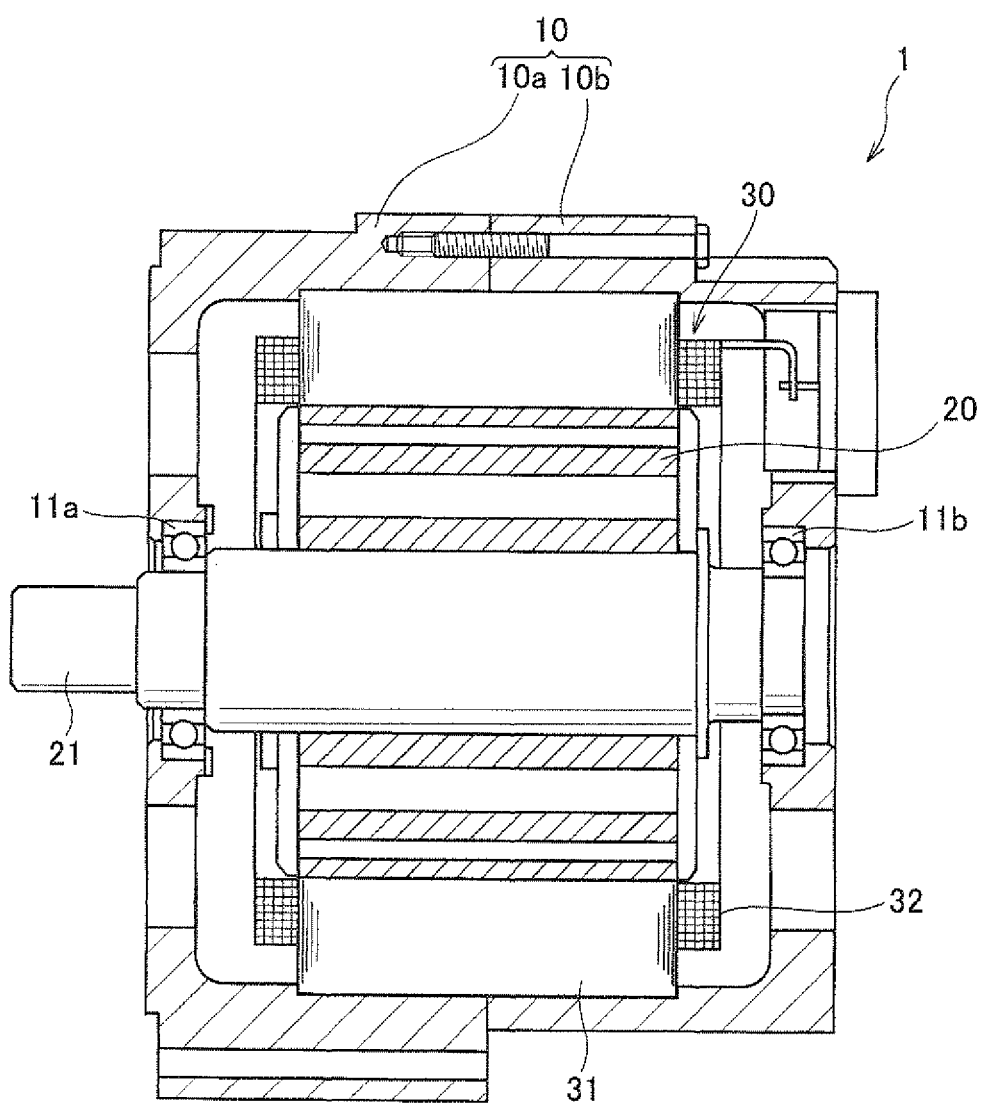
FIG. 1 is a longitudinal sectional view which shows an electric rotating machine according to the first embodiment of the invention.

Referring to the drawings, wherein like reference numbers refer to like parts in several views, particularly to FIG. 1, there is shown an electric rotating machine 1 according to the first embodiment of the invention which is designed to be installed in automotive vehicles as an electric motor, an electric generator, or a generator-motor.

The electric rotating machine 1 is equipped with a hollow cylindrical housing 10, a rotor 20, and a stator 30. The housing 10 is made up of a front cup 10a and a rear cup 10b which are joined at openings thereof together. The front and rear cups 10a and 10b have installed therein bearings 11a and 11b through which a rotating shaft 21 is retained to be rotatable.

The rotor 20 is fit on the rotating shaft 21 to be rotatable together. The stator 30 is disposed inside the housing 10 and surrounds the periphery of the rotor 20. The rotor 20 has a plurality of permanent magnets arrayed on an outer circumference thereof facing an inner circumference of the stator 30. The permanent magnets are so oriented as to have S-poles and N-poles arrayed alternately in the circumferential direction of the rotor 20.

Figure 2:
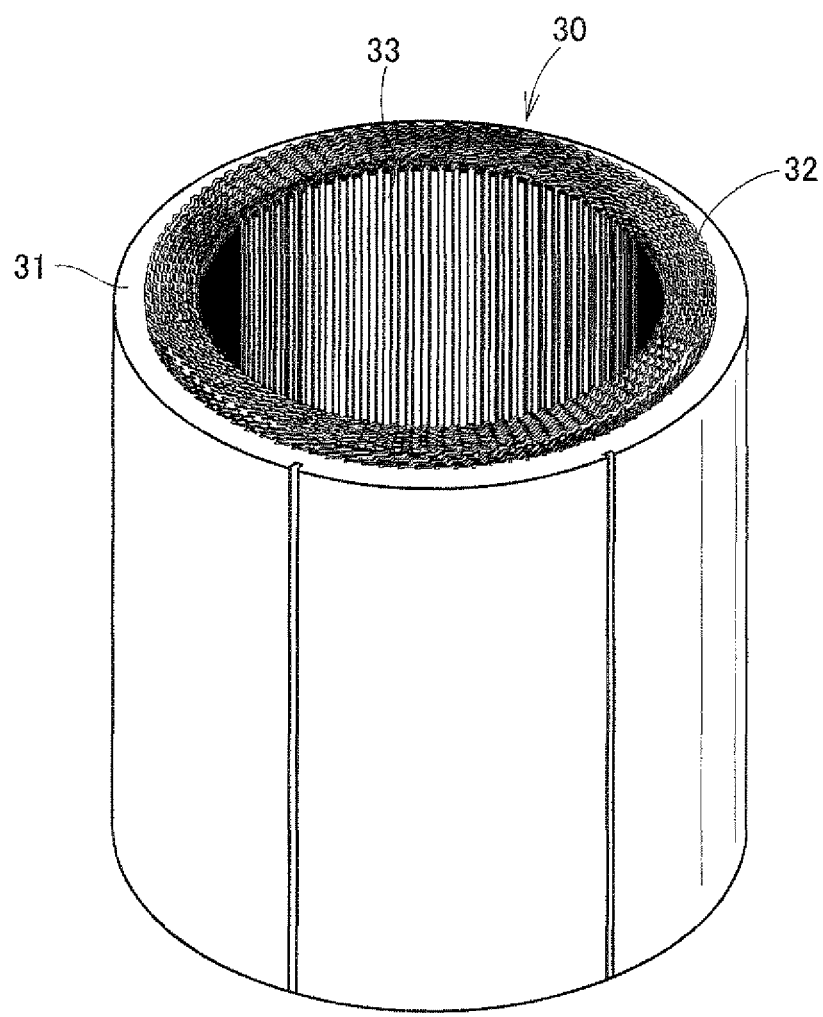
FIG. 2 is a perspective view which shows a stator installed in the electric rotating machine of FIG. 1.
Figure 3:
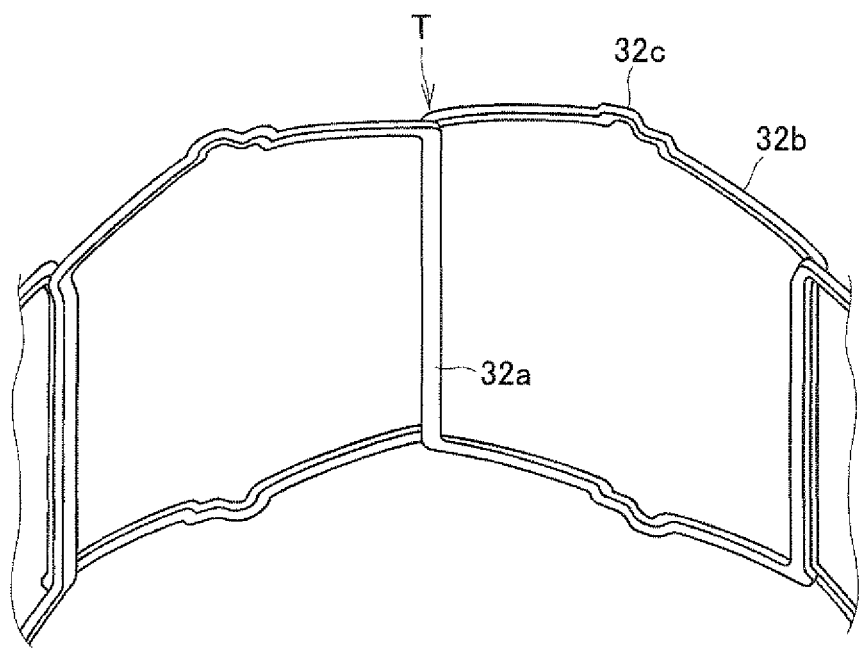
FIG. 3 is a partially perspective view which shows a stator winding.

FIG. 2 is a perspective view which shows the stator 30. FIG. 3 is a partially perspective view which illustrates a configuration of a stator winding 32 wound in the stator 30 of FIG. 2.

The stator 30 is, as illustrated in FIG. 2, made up of a stator core 31 and the stator winding 32.

The stator core 31 is made of a plurality of magnetic plates stacked in an axial direction of the stator core 31 in the form of a hollow cylinder and has a plurality of slots 33 extending in the axial direction of the stator core 31. The slots 33 are arrayed at a regular interval in the circumferential direction of the stator core 31 and open at an inner circumference of the stator core 31.

The stator winding 32 is made of wire wound in the stator core 31. The stator winding 32, as illustrated in FIG. 3, has straight in-slot portions 32a disposed in the slots 33 and turned portions 32b each of which connects two of the in-slot portions 32a. Each of the turned portions 32b extends outside either of axially-opposed ends of the stator core 31 in the circumferential direction of the stator core 31.

The in-slot portions 32a are, as indicated by "T" in FIG. 3, laid to overlap in each of the slots 33. In other words, the in-slot portions 32a are, as already described in the introductory part of this application, arrayed within the slot 33 in the form of layers stacked or aligned in the radial direction of the stator core 31. The in-slot portions 32a placed in the same layer position within the slot 33 are connected mechanically through the turned portions 32b to make one layer as a whole in the stator core 31.

The middle of each of the turned portion 32b, as denoted by 32c in FIG. 3, is shaped in the form of a crank without twisting. Each of the crank 32c is located farthest from one of the opposed ends of the stator core 31 and extends substantially parallel to a corresponding one of the opposed ends of the stator core 31. This permits the turned portions 32b to be laid very close to each other in the radial direction of the stator core 31, thereby minimizing the width of coil ends in the radial direction of the stator core 31 without the stator winding 32 protruding outside the circumference of the stator core 31.

The stator winding 32 is made up of a conductor and an electrically insulating film covering the conductor. The insulating film is made of, for example, polyamide-imide.

Figure 4:
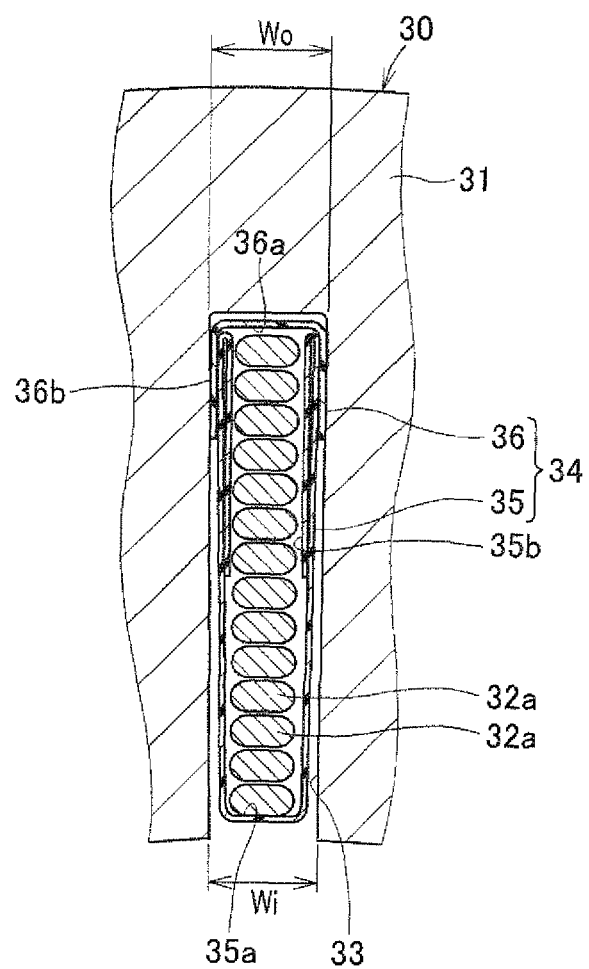
FIG. 4 is a partially enlarged view of a transverse sectional area of a stator installed in the electric rotating machine of FIG. 1.

The stator 30 will be described below in detail with reference to FIG. 4. FIG. 4 is a partially enlarged view of a transverse sectional area of the stator 30 extending perpendicular to the axial direction of the stator core 31.

The stator core 31, as already described, has the slots 33 arrayed at an equi-interval in the circumferential direction thereof. Each of the slots 33 extends through the stator core 31 in the axial direction thereof and has a trapezoidal sectional area elongated in the radius direction of the stator core 31, as can be seen in FIG. 4. Each of the slots 33 opens to the inner surface of the stator core 31 and has a varying width, as defined in the circumferential direction of the stator core 31. The width increases gradually in a radial outward direction of the stator core 31. If an innermost width and an outermost width of the slot 33 are defined as Wi and Wo, Wo is 1.1 to 1.5 times Wi.

The in-slot portions 32a of the stator winding 32 pass through the slots 33. Specifically, the in-slot portions 32a are, as clearly illustrated in FIG. 4, arranged within the slot 33 in the form of a stack of layers aligned in the radial direction of the stator core 31. An electric insulator 34 is disposed between the array of the in-slot portions 32a and the inner wall of the stator core 31. The insulator 34 is made of resin and includes a slot insulator 35 and a clip 36 fit on the slot insulator 35. The slot insulator 35 is of a U-shape in cross section. Similarly, the clip 36 is of a U-shape in cross section. The slot insulator 35 covers the array of the in-slot portions 32a. The clip 36 closes an open end of the slot insulator 35 to cover the whole of the array of the in-slot portions 32a together with the slot insulator 35.

The slot insulator 35 has the open end oriented in the radial outward direction of the stator core 31. Specifically, the slot insulator 35 has an innermost portion as a bottom 35a facing the center of the stator core 31 and side walls extending from the bottom 35a along the side walls of the slot 33. The slot insulator 35 also has end portions 35b folded inwardly. The end portions 35b extend to the middle of the slot 33 in the radial direction of the stator core 31.

Figure 5:
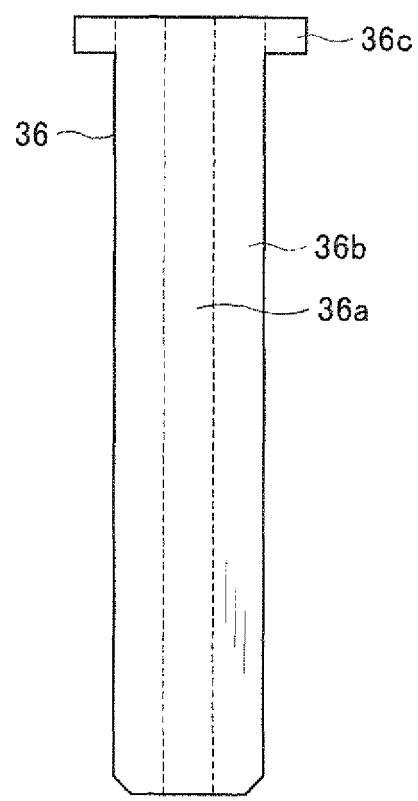
FIG. 5 is a development view which shows an outer insulator for a stator winding of the electric rotating machine of FIG. 1.

The clip 36 has an open end facing in the radial inward direction of the stator core 31. Specifically, the clip 36 has an outermost portion as a bottom 36a opposed to the open end thereof and side walls 36b which are bent and extend from the bottom 36a along the side walls of the slot 33 in the radial inward direction of the stator core 31. The side walls 36b are located outside the side walls of the slot insulator 35. FIG. 5 is a development view of the clip 36. The clip 36 is bent at substantially right angles along broken lines and inserted into the length of each of the slots 33. The clip 36 also has tabs 36c protruding outward from ends of the side walls 36b. The tabs 36c lie outside the end surface of the stator core 31.

Figure 6:
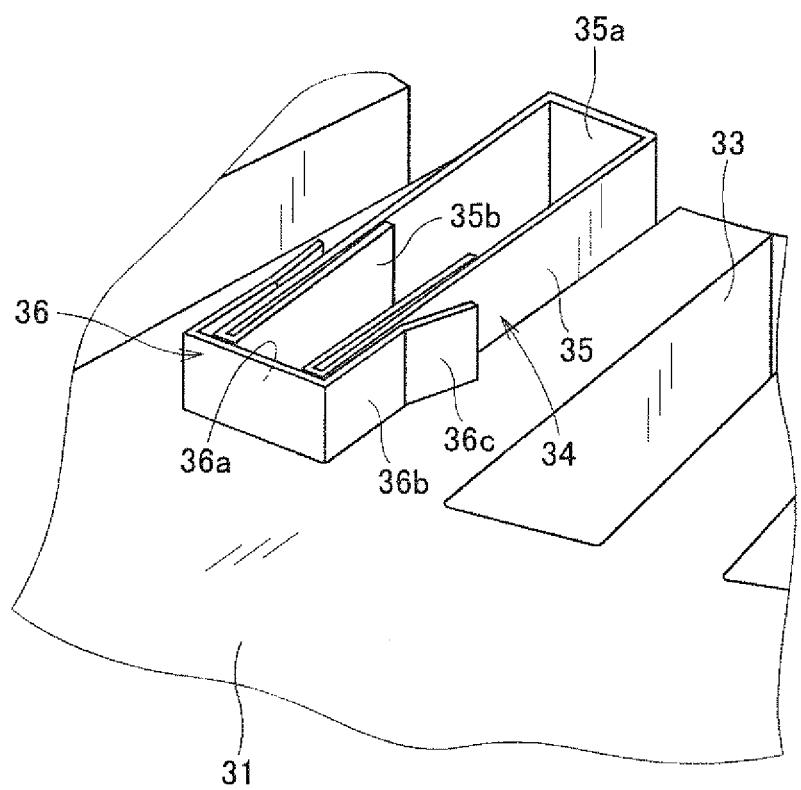
FIG. 6 is a partially perspective view which shows an insulator installed in a slot of a stator core of a stator built in the electric rotating machine of FIG. 1.

The clip 36 is, as clearly illustrated in FIG. 6, disposed in the slot 33 with the tabs 36c being retained on the upper end surface of the stator core 31, thereby holding the clip 36 and the slot insulator 35 from slipping into the slot 33 undesirably. The insulator 34, as can be seen in FIG. 6, insulates a radially-outward portion of the array of the in-slot portions 32a in the form of three layers.

Figure 7:
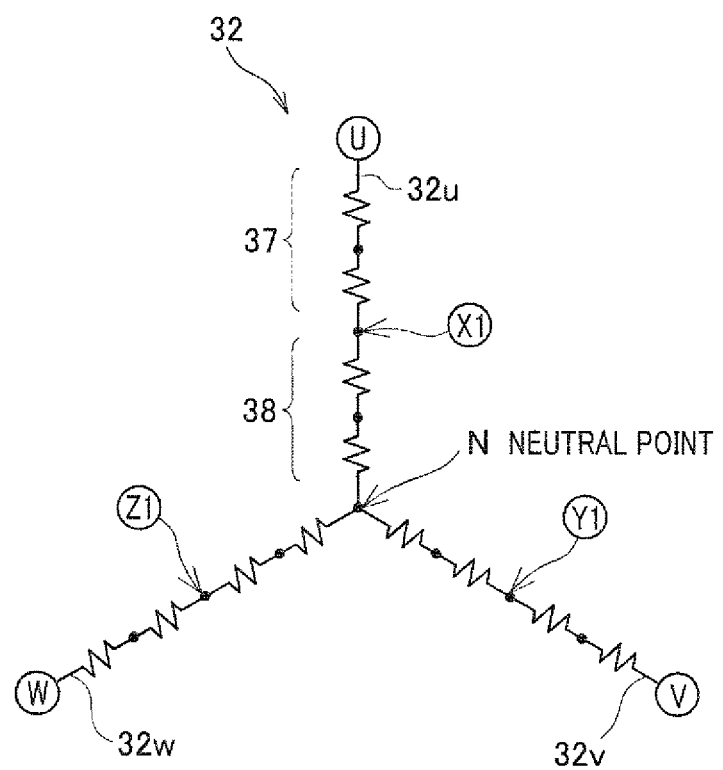
FIG. 7 is a schematic view which illustrates the structure of a stator winding of the electric rotating machine of FIG. 1.

FIG. 7 is a schematic view which illustrates the structure of the stator winding 32. The stator winding 32 is made up of the U-phase winding 23u, the V-phase winding 32v, and the W-phase winding 32w which are star-connected at the neutral point N.

The U-phase winding 23u, the V-phase winding 32v, and the W-phase winding 32w have joints X1, Y1, and Z1, respectively. Specifically, the U-phase winding 32u is made by welding wires at the joint X1. The same is true of the V-phase winding 32v and the W-phase winding 32w. A portion of the U-phase winding 32u between the end and the joint X1 will also be referred to below as an first winding 37. A portion of the U-phase winding 32u between the joint X1 and the neutral point N will also be referred to below as an second winding 38. The same applies to the V-phase winding 32v and the W-phase winding 32w.

The first winding 37 and the second winding 38 are, as described above, defined or discriminated from each other at the joint X1 which lies substantially at the middle of the length of the U-phase winding 32u, but it is not limited to such a manner. Basically, the first winding 37 is defined by a portion of a length of the stator winding 32 which is closer to any of the ends of the U-phase winding 32u, the V-phase winding 32v, and the W-phase winding 32w which are to be connected to an external such as an inverter, while the second winding 38 is defined by a portion of the length of the stator winding 32 which is farther from any of the ends of the U-phase winding 32u, the V-phase winding 32v, and the W-phase winding 32w. Each of the U-phase winding 32u, the V-phase winding 32v, and the W-phase winding 32w may alternatively be made by a single string of wire with no joints.

Figure 18:
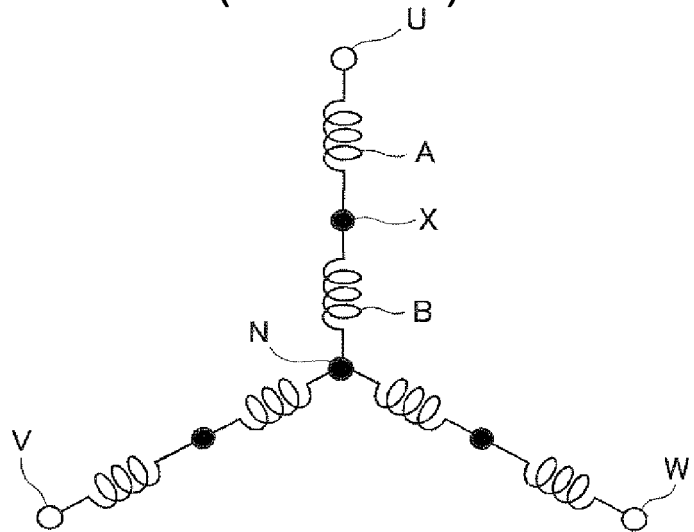
FIG. 18 is a schematic view which illustrates the structure of a stator winding of a conventional electric rotating machine.
Figure 19:
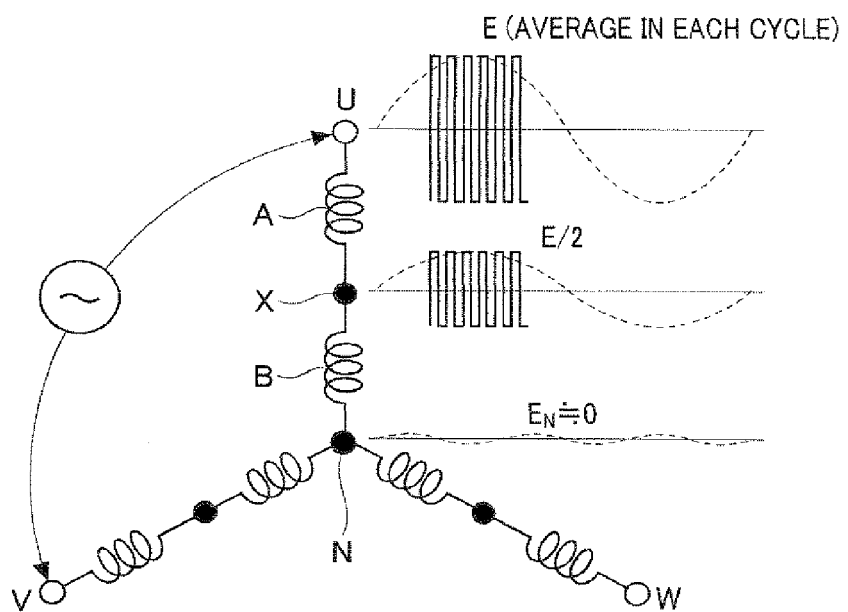
FIG. 19 is an explanatory view which shows an average potential at a conventional stator winding.

The electric potential developed at the stator winding 32 will be described below with reference to FIG. 18. FIG. 18 is, as already described in the introductory part of this application, a schematic view which shows a typical star-connected stator winding made up of U-, V-, and W-phase windings. "A" indicates a winding portion closer to an end U of the U-phase winding. "B" indicates a winding portion of the U-phase winding closer to the neutral point N. In the case where the joint X of the winding portions A and B lies just at the middle between the end U and the neutral point N, an average potential developed at the joint X will be, as demonstrated in FIG. 19, a one-half (½) of that developed at the end U.

Figure 8:
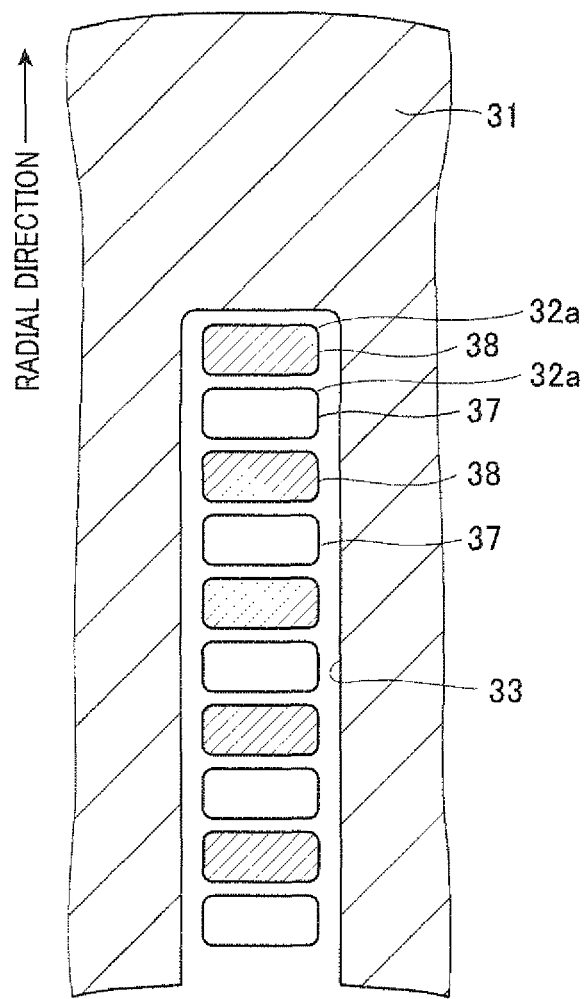
FIG. 8 is a partially transverse sectional view which shows an array of in-slot portions of a stator winding of the electric rotating machine of FIG. 1.

In view of the fact that the average potential is high at the ends of the stator winding 32, the structure of the stator 30 features the layout of the in-slot portions 32a of the stator winding 32 within the slots 33. Specifically, in each of the slots 33 except one, one of the in-slot portions 32a of the second winding 38 of each of the U-phase, V-phase, and W-phase windings 32u, 32v and 32w is, as clearly illustrated in FIG. 8, placed in the outermost layer position. The in-slot portions 32a of the first winding 37 and the second winding 38 are placed alternately in the radially inward direction of the stator core 31. FIG. 8 represents transverse sections of the in-slot portions 32a arrayed within the slot 33 in the radial direction of the stator core 31. The hatched and non-hatched transverse sections indicate the second winding 38 and the first winding 37, respectively.

The structure of the stator winding 32 will also be described with reference to FIG. 9. Actually, the stator winding 32 is designed to have eight (8) poles with the ten (10) in-slot portions 32a being disposed in each of the slots 33. For the sake of simplicity of illustration, FIG. 9 shows the stator winding 32 which has four poles with the four (4) in-slot portions 32a being disposed in each of the slots 33.

Figure 9:
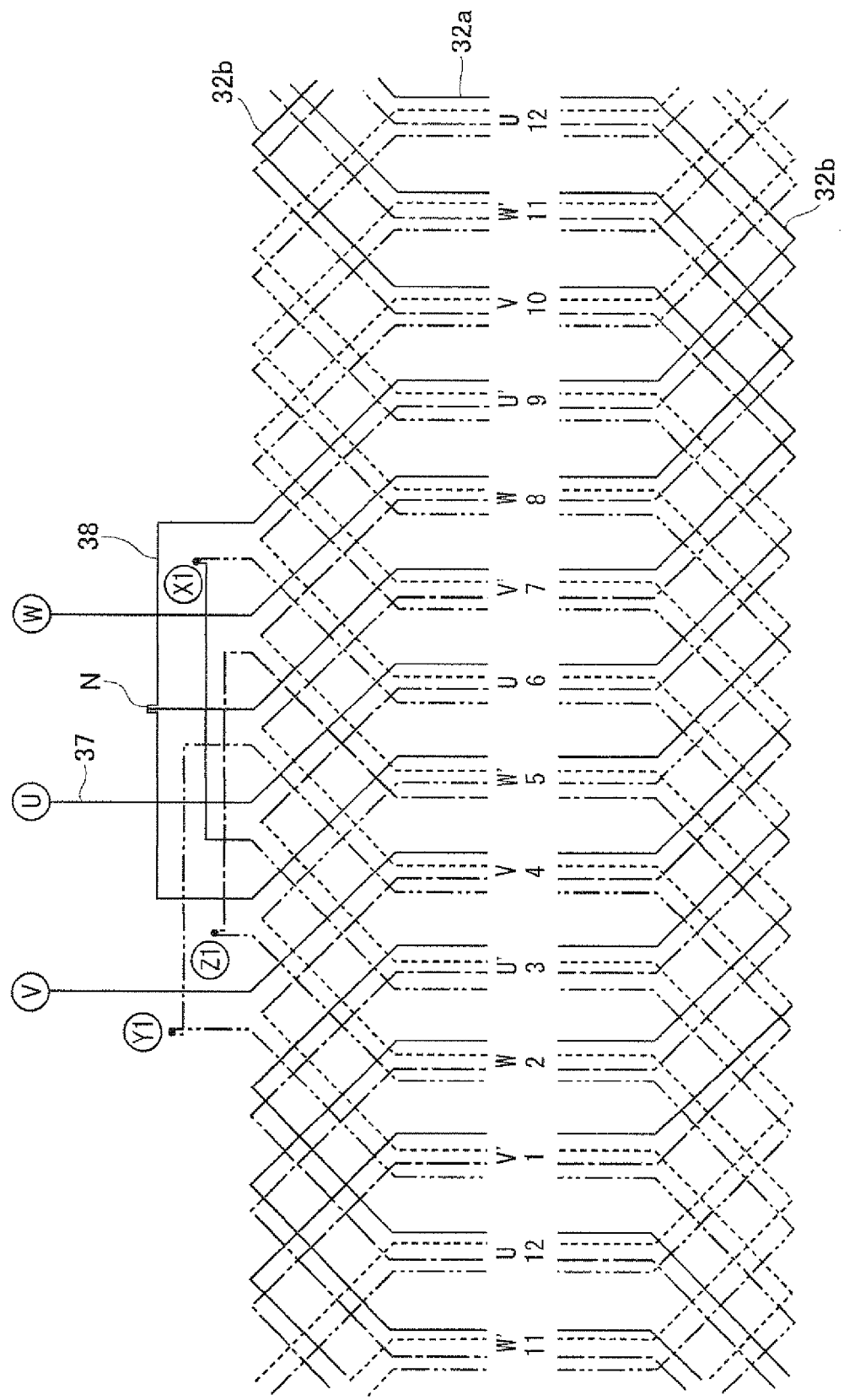
FIG. 9 is a schematic view which shows the structure of a stator winding of the electric rotating machine of FIG. 1.

In FIG. 9, "U", "V", and "W" represent the ends of the U-phase winding 32u, the V-phase winding 32v, and the W-phase winding 32w, respectively, which are to be connected electrically to an external such as an inverter "X1", "Y1", and "Z1" indicate the joints X1, Y1, and Z1 of the U-phase winding 32u, the V-phase winding 32v, and the W-phase winding 32w, respectively. Diagonal lines represent the turned portions 32b of the stator winding 32. Straight lines connecting at ends thereof with the diagonal lines represent the in-slot portions 32a. Numerals and upper case characters indicate the numbers of the slots 33 in which the in-slot portions 32a of the U-phase winding 32u, the V-phase winding 32v, and the W-phase winding 32w are to be arranged. A solid line denotes the first layer (i.e., the outermost layer) within the slot 33. A dashed line denotes the second layer. A one-dot chain line denotes the third layer. A two-dot chain line denotes the fourth layer (i.e. the innermost layer). U', V', and W' represent a U-phase winding, a V-phase winding, and a W-phase winding through which current flows in direction opposite in phase windings, as denoted by U, V, and W. A combination of the U'-phase winding and the U-phase winding makes up the U-phase winding 32u, as described above. The same is true of the V-phase winding 32v and the W-phase winding 32w.

The first winding 37 extending from the end of the U-phase winding 32u forms:
 the first layer in No. 6 slot 33;
 the second layer in No. 9 slot 33;
 the second layer in No. 12 slot 33;
 the second layer in No. 3 slot 33;
 the third layer in No. 6 slot 33;
 the fourth layer in No. 9 slot 33;
 the fourth layer in No. 12 slot 33, and
 the fourth layer in No. 3 slot 33 in that order and then reaches the joint X1.

The second winding 38 following the joint X1 forms:
 the fourth layer in No. 6 slot 33;
 the third layer in No. 3 slot 33;
 the third layer in No. 12 slot 33;
 the third layer in No. 9 slot 33;
 the second layer in No. 6 slot 33;
 the first layer in No. 3 slot 33;

the first layer in No. 12 slot 33; and the first layer in No. 9 slot 33 in that order and then reaches the neutral point N.

Figure 11:
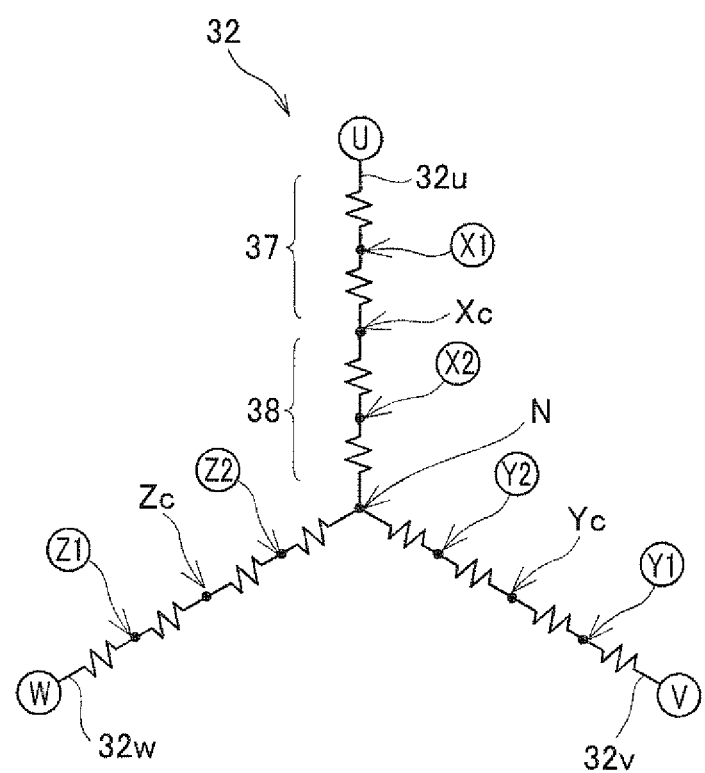
FIG. 11 is a schematic view which illustrates the structure of a stator winding according to the second embodiment of the invention.
Figure 12:
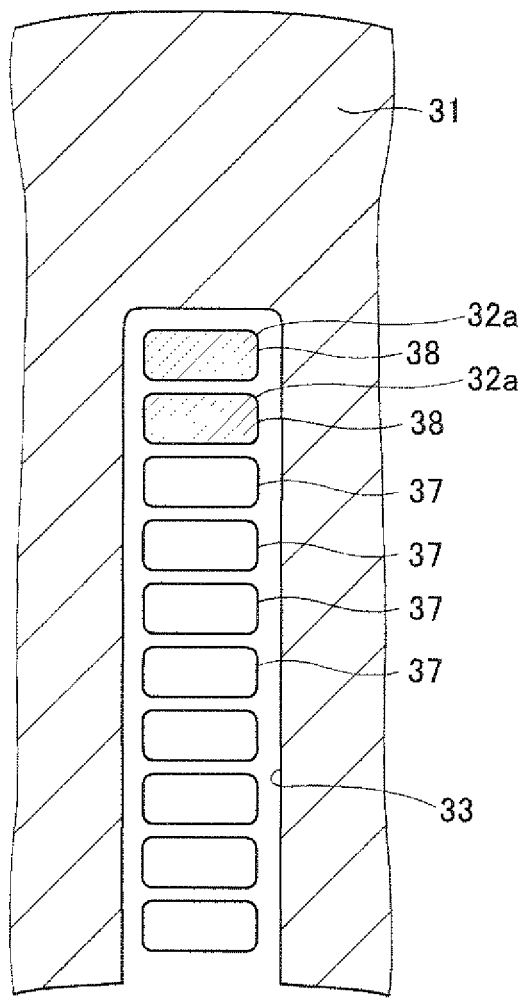
FIG. 12 is a partially transverse sectional view which shows an array of in-slot portions of a stator winding of the second embodiment of the invention.
Figure 13:
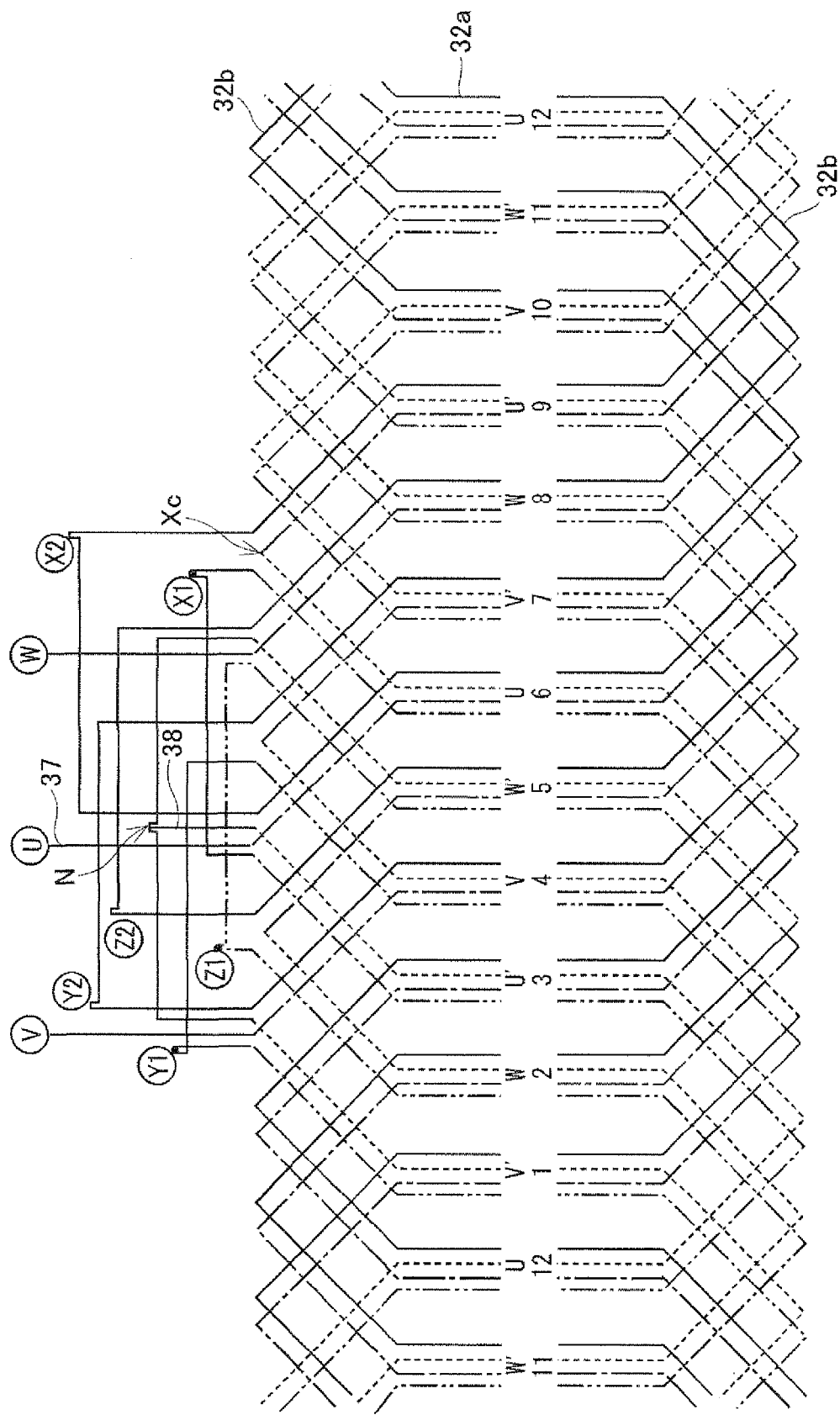
FIG. 13 is a schematic view which shows the structure of a stator winding of the second embodiment of the invention.

As apparent from the above explanation, the second winding 38 of the U-phase winding 32u is disposed in the first layer position (i.e., the outermost position) within No. 3, No. 9, and No. 12 slots 33. The first winding 37 and the second winding 38 are placed alternately with in the slot 33 in the radially inward direction of the stator core 31. No. 6 slot 33 makes an exception and is different in layout of the in-slot portions 32a of the stator winding 32 from the other slots 33 because the end U of the U-phase winding 32u needs to extend outside the stator core 31. Similarly, the second winding 38 of the V-phase winding 32v is disposed in the first layer position within each of three of the four slits 33. The first winding 37 and the second winding 38 are placed alternately with in each of the three slot 33 in the radially inward direction of the stator core 31. The remaining one slot 33 is different in layout of the in-slot portions 32a of the stator winding 32 from the other slots 33 because the end V of the V-phase winding 32v needs to extend outside the stator core 31. The same does not apply to the W-phase winding 32w in this embodiment. The stator winding 32 of the second embodiment, as will be described later in FIGS. 11 to 13, is, however, so designed that the U-phase winding 32u, the V-phase winding 32v, and the W-phase winding 32w are all identical in layout of the in-slot portions 32a in the slots 33.

Figure 10:
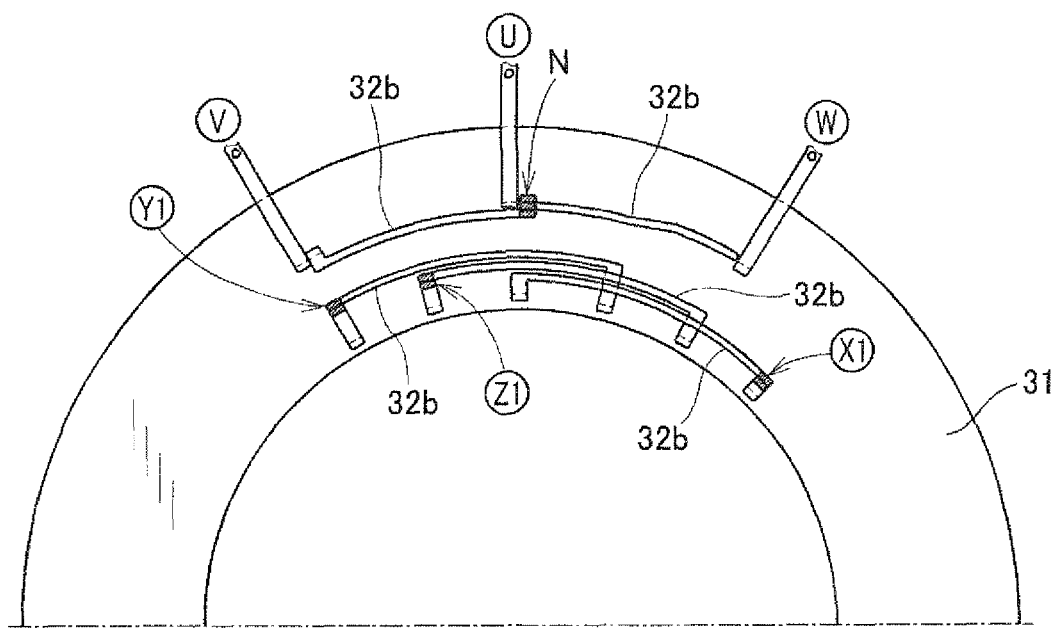
FIG. 10 is a schematic top view which illustrates a coil end of a stator winding of the electric rotating machine of FIG. 1.

FIG. 10 is a schematic top view which illustrates the joints X1, Y1, and Z1 and the neutral point N at the coil end of the stator 30, as viewed from the axial direction of the stator 30. The ends U, V, and W of the U-phase, V-phase, and W-phase windings 32u, 32v, and 32w extend from the coil end in the radially outward direction of the stator core 31. The other ends of the U-phase, V-phase, and W-phase windings 32u, 32v, and 32w are welded together as the neutral point N. The joints X1, Y1, and Z1 are created by welding the turned portions 32b.

The beneficial advantages of the stator 30 will be described below.

In each of No. 3, No. 9, and No. 12 slots 33, the second winding 38 of the U-phase winding 32u is disposed in the first layer position (i.e., the outermost position). Of No. 3, No, 6, No, 9, and No. 12 slots 33 for the U-phase winding 32u, three other than No. 6 slot 33 each have the second winding 38 placed in the outermost layer position (i.e., the first layer position). Additionally, the second winding 38 and the first winding 37 are aligned alternately from the outermost layer position to the innermost layer position.

Figure 20:
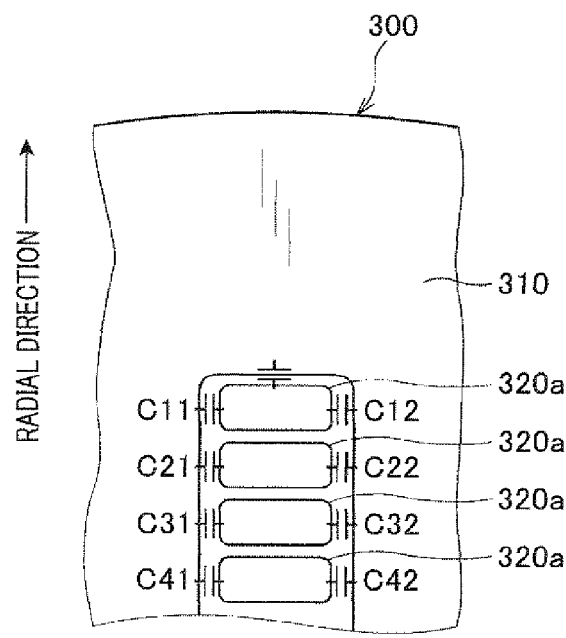
FIG. 20 is a partially transverse sectional view which shows capacitors, as created between a stator winding and a stator core.

As apparent from FIG. 20, the electrostatic capacitance C1, as established by the in-slot portion 320a placed in the outermost layer position, is given by $$C1=C10+C11+C12$$

Similarly, capacitances C2 to C4, as created by the in-slot portions 320a in the second to fourth layer positions, are given by $$C2=C21+C22$$

$$C3=C31+C32$$

$$C4=C41+C42$$

The stator winding 32 is made of a flat wire, so that the long sides of each of the in-slot portions 320a is much greater than the short sides thereof. The capacitance C10 of the in-slot portion 320a having a greater area exposed directly to the inner wall of the slot 33 is, therefore, greatest within the slot 33. Thus, the following relation is met.

$$C1 \gg C2, C3, C4$$

If average potentials at the in-slot portions 320a placed in the first and fourth layer positions are defined as V1, V2, V3, and V4, the leakage current I is expressed by $$I = \Sigma dQ/dt = \Sigma d(Ck \cdot Vk)/dt (k=1,2,3,4)$$

Therefore, if the first winding 37 is placed in the outermost layer position in the slot 33, the capacitance C1 and the average potential V1 will be high, so that the total charge in the slot 33 will also be great. This results in an increase in leakage current I.

In order to alleviate the above drawback, the stator 33 of this embodiment is so designed that of No. 3, No, 6, No, 9, and No. 12 slots 33 for the U-phase winding 32u, three other than No. 6 slot 33 each have the second winding 38 placed in the outermost layer position (i.e., the first layer position). In other words, the second winding 38 that is low in average potential is disposed in the outermost side of the slot 33 where the electrostatic capacitance C1 is greatest, thereby minimizing the leakage current I. The second winding 38 may be placed most outward in at least one of the slots 33 for at least one of the U-phase winding 32u, the V-phase winding 32v, and the W-phase winding 32w.

The stator winding 32 is, as described above, made of a flat wire and so wound in the stator core 31 that long sides of a transverse section of each of the in-slot portions 32a extend substantially perpendicular to the radial direction of the stator core 31 (i.e., the stator winding 32), thus resulting in a great increase in electrostatic capacitance C10. The arrangement of the second winding 38 in the outermost layer position is, therefore, greatly effective in decreasing the leakage current.

The width of each of the slots 33, as described above, increases gradually in the radially outward direction of the stator core 31. Specifically, the outermost width Wo is 1.1 to 1.5 times the innermost width Wi (see FIG. 4). This causes the distance between the inner wall of the slot 33 (i.e., the stator core 31) and the side surface of the stator winding 32 to increase in the radially outward direction, thereby resulting in a decrease in electrostatic capacitance, as produced by the in-slot portion 32a placed in the outermost layer position within the slot 33, which also leads to a decrease in leakage current I.

The stator 30 also includes the insulators 34, one in each of the slots 33. The insulator 34 is disposed between the array of the in-slot portions 32a and the stator core 31. The insulator 34 is made up of the slot insulator 35 and the clip 36. The slot insulator 35 has the side walls extending along the side walls of the slot 33 in the radial direction of the stator core 31. The side walls of the slot insulator 35 have the end portions 35b which are folded inwardly and extend to the middle of the slot 33 in the radial direction of the stator core 31. The clip 36 has the side walls 36b located outside the folds of the slot insulator 35 (see FIG. 4). The insulator 34 covers the radially-outward portion of the array of the in-slot portions 32a in the form of three layers, thereby filling an air gap between the radially-outward portion of the array of the in-slot portions 32a and the inner wall of the slot 33 to minimize undesirable movement of the stator winding 32 in the circumferential direction of the stator core 31.

The clip 36 is disposed in the slot 33 with the tabs 36c lying on the upper end surface of the stator core 31, thereby holding the clip 36 and the slot insulator 35 from slipping into the slot 33 undesirably.

The end portions 35b of the slot insulator 35 are, as described above, are folded inwardly, thereby facilitating ease of inserting the slot insulators 35 into the slots 33 when the stator 30 is assembled.

The stator 30 may be so designed that the second winding 38 of at least one of the U-phase winding 32u, the V-phase winding 32v, and the W-phase winding 32w is disposed in the first layer position (i.e., the outermost position) in at least one of the slots 33.

The stator 30 of the second embodiment will be described below which is different in structure of the stator winding 32 from the first embodiment. Other arrangements are identical, and explanation thereof in detail will be omitted here. The same reference numbers as employed in the first embodiment refer to the same parts.

FIG. 11 illustrates the stator winding 32 of the second embodiment. The stator winding 32 is, like in the first embodiment, a three-phase winding made of the U-phase winding 32u, the V-phase winding 32v, and the W-phase winding 32w which are star-connected at the neutral point N.

The U-phase winding 32u has wire segments welded to make joints X1, X2, and Xc. Similarly, the V-phase winding 32v has wire segments welded to make joints Y1, Y2, and Yc. The W-phase winding 32u has wire segments welded to make joints Z1, Z2, and Zc. Actually, the joints Xc, Yc, and Zc are not welds, but provided only for defining the first winding 37 and the second winding 38.

In the stator 30 of this embodiment, the second winding 38 is, as illustrated in FIG. 12, placed in the outermost layer position in all the slots 33. Specifically, the in-slot portions 32a of the second winding 38 are aligned radially of the stator core 31 in an outside portion of the slot 33, while the in-slot portions 32a of the first winding 37 are aligned radially of the stator core 31 in an inside portion of the slot 33. In other words, the in-slot portions 32a placed in each of the slots 33 are broken down into a first group and a second group. The first group defines the first winding 37 and is placed outward of the slot 33, while the second group defines the second winding 38 and is placed inward of the slot 33.

FIG. 12 represents transverse sections of the in-slot portions 32a arrayed within the slot 33 in the radial direction of the stator core 31. The hatched sections are the transverse sections of the second winding 38. The non-hatched sections are the transverse sections of the first winding 37.

FIG. 13 illustrates the structure of the stator winding 32. Actually, the stator winding 32 is designed to have eight (8) poles with the ten (10) in-slot portions 32a being disposed in each of the slots 33. For the sake of simplicity of illustration, FIG. 13 shows the stator winding 32 which has four poles with the four (4) in-slot portions 32a being disposed in each of the slots 33.

In FIG. 13, "U", "V", and "W" represent the ends of the U-phase winding 32u, the V-phase winding 32v, and the W-phase winding 32w, respectively. "X1", "X2", "Y1", "Y2", "Z1", and "Z2" indicate the joints X1, X2, Y1, Y2, 21, and Z1 of the U-phase winding 32u, the V-phase winding 32v, and the W-phase winding 32w, respectively. Diagonal lines represent the turned portions 32b of the stator winding 32. Straight lines connecting at ends thereof with the diagonal lines represent the in-slot portions 32a. Numerals and upper case characters indicate the numbers of the slots 33 in which the in-slot portions 32a of the U-phase winding 32u, the V-phase winding 32v, and the W-phase winding 32w are to be arranged. A solid line denotes the first layer (i.e., the outermost layer) within the slot 33. A dashed line denotes the second layer. A one-dot chain line denotes the third layer. A two-dot chain line denotes the fourth layer (i.e. the innermost layer).

The first winding 37 extending from the end of the U-phase winding 32u forms:
the third layer in No. 6 slot 33;
the fourth layer in No. 9 slot 33;
the fourth layer in No. 12 slot 33;
the fourth layer in No. 3 slot 33;
the joint X1;
the fourth layer in No. 6 slot 33;
the third layer in No. 3 slot 33;
the third layer in No. 12 slot 33; and
the third layer in No. 9 slot 33 in that order and then reaches the joint Xc.

The second winding 38 following the joint X1 forms:
the second layer in No. 6 slot 33;
the first layer in No. 3 slot 33;
the first layer in No. 12 slot 33;
the first layer in No. 9 slot 33;
the joint X2;
the first layer in No. 6 slot 33;
the second layer in No. 9 slot 33;
the second layer in No. 12 slot 33; and
the second layer in No. 3 slot 33 in that order and then reaches the neutral point N.

As apparent from the above explanation, the second winding 38 of the U-phase winding 32u is disposed in the first layer position (i.e., the outermost position) and the second layer position within all of No. 3, No, 6, No. 9, and No. 12 slots 33. The first winding 37 is disposed in the third and fourth layer positions in No. 3, No, 6, No. 9, and No. 12 slots 33.

Figure 14:
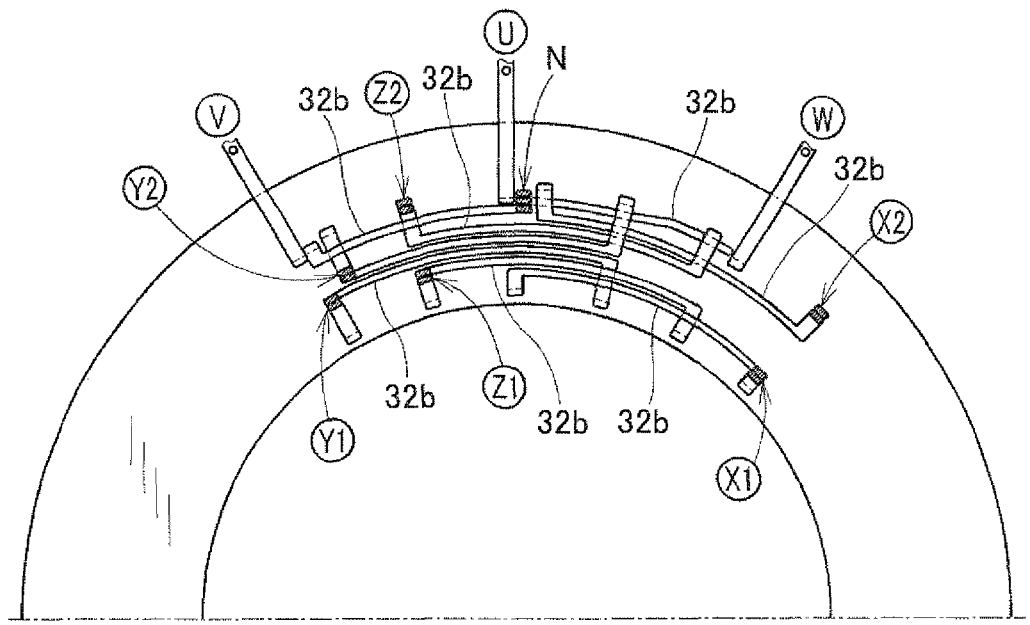
FIG. 14 is a schematic top view which illustrates a coil end of a stator winding of second embodiment of the invention.

FIG. 14 is a schematic top view which illustrates the layout of the joints X1, X2, Y1, Y2, Z1, and Z2 and the neutral point N at the coil end of the stator 30, as viewed from the axial direction of the stator 30. The ends U, V, and W of the U-phase, V-phase, and W-phase windings 32u, 32v, and 32w extend from the coil end in the radially outward direction of the stator core 31. The other ends of the U-phase, V-phase, and W-phase windings 32u, 32v, and 32w are welded together as the neutral point N. The joints X1, X2, Y1, Y2, Z1, and Z2 are created by welding the turned portions 32b.

The arrangement of the in-slot portions 32a of the stator winding 32 in this embodiment offers substantially the same beneficial effects as those in the first embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The stator winding 32 may alternatively be made of the U-phase winding 32u, the V-phase winding 32v, and the W-phase winding 32w which are delta-connected. In this case, there is no neutral point N. The in-slot portions 32a remote from the ends U, V, and W of the U-phase winding 32u, the V-phase winding 32v, and the W-phase winding 32w are low in average potential and, therefore, disposed as the second windings 38 in the slots 33 of the stator core 31.

Figure 15:
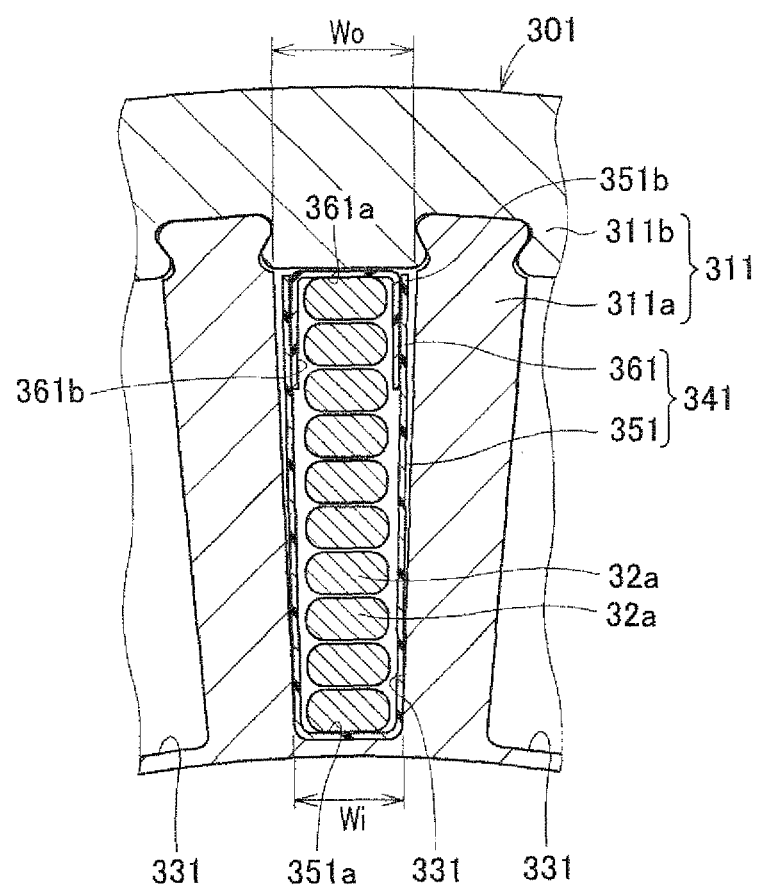
FIG. 15 is a partially enlarged sectional view of a modification of a stator to be installed in the electric rotating machine of FIG. 1.

A stator 301, as illustrated in FIG. 15, may be used instead of the stator 30. The stator 301 is equipped with a stator core assembly 311 made up of an inner core 311a and an outer core 311b. The inner core 311a has formed therein a plurality of slots 331 which extend in the axial direction of the stator core assembly 311 and have ends opening at the outer periphery thereof. The slots 311 are, like in the first embodiment, arrayed at a regular interval in a circumferential direction of the inner core 311a. The outer core 311b is fit on the outer periphery of the inner core 311a so as to close the openings of the slots 311. The assembling of the inner core 311a and the outer core 311b is achieved by sliding the outer core 311b on the outer periphery of the inner core 311a in an axial direction of the stator core assembly 311.

Each of the slots 331 has a varying width, as defined in the circumferential direction of the inner core 311a. The width increases gradually in a radial outward direction. If an innermost width and an outermost width of the slot 331 are defined as Wi and Wo, Wo is 1.1 to 1.5 times Wi.

An electric insulator 341 is disposed between the array of the in-slot portions 32a and the inner wall of the stator core assembly 311. The insulator 341 includes a slot insulator 351 and a clip 361 fit in an open end of the slot insulator 351. The slot insulator 351 is of a U-shape in cross section. Similarly, the clip 361 is of a U-shape in cross section. The slot insulator 351 covers the array of the in-slot portions 32a. The clip 361 closes the open end of the slot insulator 351 to cover the whole of the array of the in-slot portions 32a together with the slot insulator 351.

The slot insulator 351 has an innermost portion as a bottom 351a and side walls which are folded from the bottom 351a and extend along the side walls of the slot 331. The clip 361 has an outermost portion as a bottom 361a opposed to an open end thereof and side walls 361b which are bent and extend from the bottom 361a along the side walls of the slot 33 in the radial inward direction of the inner core 311a. The side walls 361b are fit in ends 351b of the side walls of the slot insulator 351 to make double layers covering a radially outward portion of the array of the in-slot portions 32a. This, like in the first embodiment, fills an air gap between the radially-outward portion of the array of the in-slot portions 32a and the inner wall of the slot 33 to minimize undesirable movement of the stator winding 32 in the circumferential direction of the stator core 31.

Figure 16:
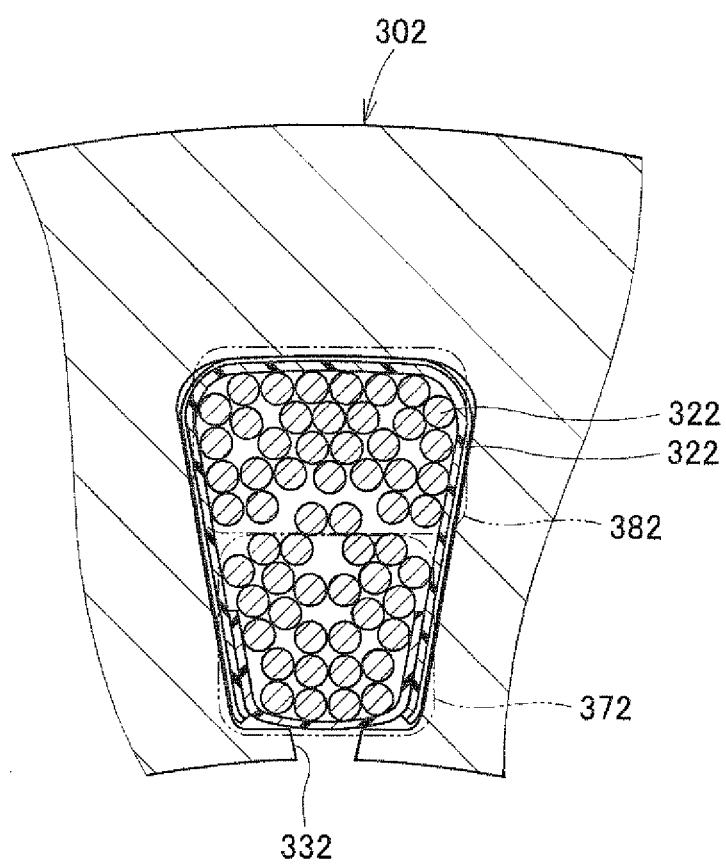
FIG. 16 is a partially enlarged sectional view which shows a modification of a stator to be installed in the electric rotating machine of FIG. 1.
Figure 17:
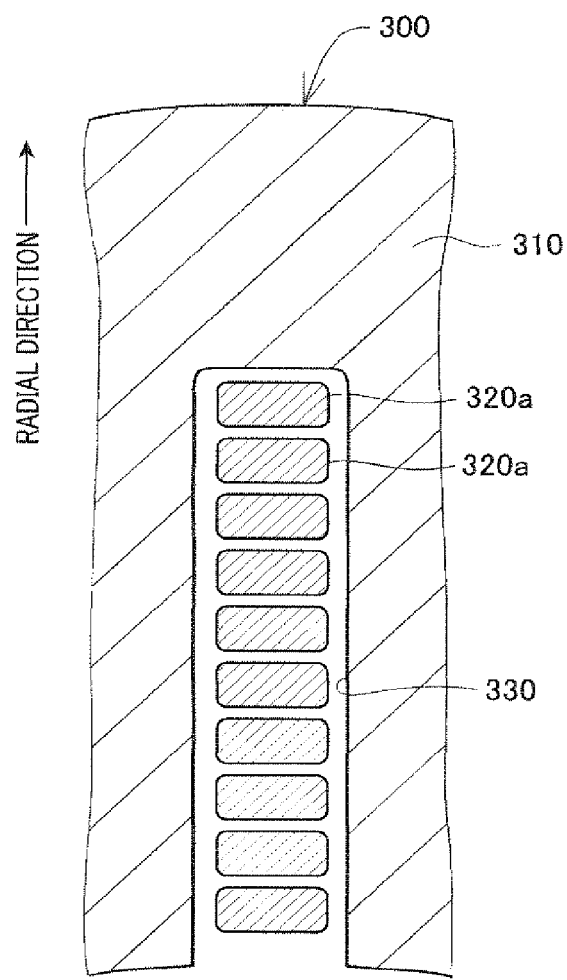
FIG. 17 is an explanatory view which illustrates an array of in-slot portions of a stator winding disposed in a conventional stator core.

The stator winding 32 may alternatively be made of wire that is circular in transverse cross section thereof. For example, the stator winding 32 may be, as illustrated in FIG. 16, made of a bundle of wires disposed in each of the slots 332. The bundle includes a second winding group 382 and a first winding group 372. The second winding group 382 is disposed in an radially outside portion of each of the slots 332, while the first winding group 372 is disposed in an radially inside portion of each of the slots 332.

What is claimed is:

1. A stator comprising:
    a cylindrical stator core which has a plurality of slots arrayed in a circumferential direction of the stator core; and
    a stator winding which includes in-slot portions disposed in the slots of the stator core and turned portions connecting the in-slot portions outside the slots, the in-slot portions being arrayed in each of the slots in a form of multiple layers aligned in a radial direction of the stator core, the stator winding having a length made up of a first winding and a second winding, the first winding being defined by a portion of the stator winding which is closer to an end of the stator winding which is to be connected to an external, the second winding being defined by a portion of the stator winding which is farther from the end of the stator,
    wherein the stator winding is a three-phase winding made up of a first-phase winding, a second-phase winding, and a third-phase winding, and
    wherein the second winding includes the in-slot portions which are placed in all of the slots for the first-phase winding and the second-phase winding except one of the slots, and each of which is laid at least in the form of an outermost layer that is one of the layers placed most outwardly in a corresponding one of the slots in a radial direction of the stator core.

2. A stator as set forth in claim 1, wherein the in-slot portions of the second winding and the in-slot portions of the first winding are aligned alternately in the radial direction of the stator core.

3. A stator as set forth in claim 1, wherein the stator winding is rectangular in transverse cross section thereof, the in-slot portions being so arrayed in each of the slots that long sides of transverse cross sections of the in-slot portions extend substantially perpendicular to the radial direction of the stator core.

4. A stator as set forth in claim 1, wherein the stator winding is made of wire segments star-connected, and wherein the second winding is defined by a portion of the stator winding closer to a neutral point.

5. A stator as set forth in claim 1, wherein each of the slots has a width, as defined in the circumferential direction of the stator core, the width increasing in a radially outward direction of the stator core.

6. A stator as set forth in claim 5, further comprising an electric insulator which has an inner chamber in which an array of the in-slot portions is disposed.

7. A stator as set forth in claim 6, wherein the electric insulator is made of an assembly of an inner insulator and an outer insulator, the inner insulator being of a U-shape in transverse cross section, as taken perpendicular to an axial direction of the stator core, and having an end which opens outwardly of the stator core, the outer insulator being of a U-shape in transverse cross section, as taken perpendicular to the axial direction of the stator core, and having an end which opens inwardly of the stator core.

8. A stator as set forth in claim 7, wherein the inner insulator has side walls extending in the radial direction of the stator core, the outer insulator having side walls extending in the radial direction of the stator core, and wherein ends of the side walls of the inner insulator are laid to overlap with ends of the side walls of the outer insulator in the circumferential direction of the stator core.

9. A stator as set forth in claim 8, wherein the ends of the side walls of the inner insulator are folded back.

10. A stator as set forth in claim 9, wherein the ends of the side walls of the inner insulator are folded inwardly of the inner insulator.

11. A stator as set forth in claim 1, wherein the first winding includes the in-slot portions each of which is disposed in one of the slots in the form of an inner layer that is one of the layers placed inside the outermost layer in the radial direction of the stator core.

12. A stator as set forth in claim 1, wherein the first winding and the second winding are made of two portions of each of the first-phase winding, the second-phase winding, and the third-phase winding, the portions being electrically connected in series with each other to have at least one joint, the first winding and the second winding being wound a plurality of times in the stator core in the same circumferential direction of the stator core.

13. A stator as set forth in claim 1, wherein the second winding is made up of the in-slot portions disposed in each of the slots of the stator core as defining ones of the layers which are arrayed alternately in the radial direction of the stator core.

14. A stator as set forth in claim 12, wherein the portions which form the first and second windings defining each of the first-phase winding, the second-phase winding, and the third-phase winding are welded together at the joint, and wherein the joints of the first-phase winding, the second-phase winding, and the third-phase winding are located more inwardly in the radial direction of the stator core than coil ends of the first-phase winding, the second-phase winding, and the third-phase winding are.

* * * * *